(12) United States Patent
Kim et al.

(10) Patent No.: US 7,269,673 B2
(45) Date of Patent: Sep. 11, 2007

(54) CABLE WITH CIRCUITRY FOR ASSERTING STORED CABLE DATA OR OTHER INFORMATION TO AN EXTERNAL DEVICE OR USER

(75) Inventors: Ook Kim, Palo Alto, CA (US); Eric Lee, San Jose, CA (US); Gyudong Kim, Sunnyvale, CA (US); Zeehoon Jang, San Jose, CA (US); Baegin Sung, Sunnyvale, CA (US); Nam Hoon Kim, Cupertino, CA (US); Gijung Ahn, San Jose, CA (US); Seung Ho Hwang, Palo Alto, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 84 days.

(21) Appl. No.: 10/781,405

(22) Filed: Feb. 18, 2004

(65) Prior Publication Data
US 2005/0182876 A1 Aug. 18, 2005

(51) Int. Cl.
*G06F 13/38* (2006.01)
(52) U.S. Cl. ...................................................... 710/72
(58) Field of Classification Search ................ None
See application file for complete search history.

(56) References Cited

U.S. PATENT DOCUMENTS

| | | | | |
|---|---|---|---|---|
| 5,615,344 A | * | 3/1997 | Corder | 710/62 |
| 5,876,240 A | * | 3/1999 | Derstine et al. | 439/490 |
| 5,885,100 A | * | 3/1999 | Talend et al. | 439/490 |
| 5,999,400 A | * | 12/1999 | Belopolsky et al. | 361/600 |
| 6,131,125 A | * | 10/2000 | Rostoker et al. | 709/250 |
| 6,165,006 A | * | 12/2000 | Yeh et al. | 439/490 |
| 6,306,718 B1 | * | 10/2001 | Singh et al. | 438/382 |
| 6,311,270 B1 | * | 10/2001 | Challener et al. | 713/169 |
| 6,473,811 B1 | * | 10/2002 | Onsen | 710/15 |
| 6,809,913 B2 | * | 10/2004 | Hochgraef et al. | 361/93.3 |
| 7,184,000 B2 | * | 2/2007 | Itakura | 345/3.1 |

(Continued)

OTHER PUBLICATIONS

David Johns, "Equalization", 1997, University of Toronto.*

(Continued)

*Primary Examiner*—Khanh Dang
(74) *Attorney, Agent, or Firm*—Girard & Equitz LLP

(57) ABSTRACT

A cable including circuitry for asserting information to a user or external device and a system including such a cable. The cable can include conductors, a memory storing cable data, and circuitry configured to respond to a request received on at least one of the conductors by accessing at least some of the cable data and asserting the accessed data serially to at least one of the conductors (e.g., for transmission to an external device). Other aspects of the invention are methods for accessing cable data stored in a cable and optionally using the data (e.g., to implement equalization). The cable data can be indicative of all or some of cable type, grade, speed, length, and impedance, a date code, a frequency-dependent attenuation table, far-end crosstalk and EMI-related coefficients, common mode radiation, intra pair skew, and other information. The cable can include a radiation-emitting element and circuitry for generating driving signals for causing the radiation-emitting element to produce an appropriate color, brightness, and/or blinking pattern.

55 Claims, 7 Drawing Sheets

U.S. PATENT DOCUMENTS

| | | | |
|---|---|---|---|
| 2003/0218550 A1* | 11/2003 | Herrmann | 340/870.39 |
| 2004/0230708 A1* | 11/2004 | Juan | 710/1 |
| 2005/0182876 A1* | 8/2005 | Kim et al. | 710/100 |
| 2007/0083905 A1* | 4/2007 | Lee | 725/105 |

OTHER PUBLICATIONS

Ciancio, et al., XICOR Application Note entitled "*The X9520 in Fibre Channel/Gigabit Ethernet Applications*", Revision 5.2, Jul. 21, 2000, six pages, downloaded from http://www.xicor.com/pdf_files/an137.pdf on Dec. 9, 2002.

* cited by examiner

CABLE WITH CIRCUITRY FOR ASSERTING STORED CABLE DATA OR OTHER INFORMATION TO AN EXTERNAL DEVICE OR USER

FIELD OF THE INVENTION

The invention pertains to a cable for connecting a transmitter to a receiver (e.g., to implement a serial link over which video and other data are transmitted from the transmitter to the receiver). The cable includes a memory that stores cable data and/or circuitry for asserting information to a user (e.g., by emitting radiation) or to an external device (e.g., a transmitter or receiver coupled to the cable). In preferred embodiments, the invention is a cable including a memory storing cable data and a serial device for asserting the cable data in serial fashion to an external device coupled to the cable.

BACKGROUND OF THE INVENTION

The term "transmitter" is used herein in a broad sense to denote any device capable of transmitting data over a serial link or other link, and optionally also capable of performing additional functions which can include encoding and/or encrypting the data to be transmitted. The term "receiver" is used herein in a broad sense to denote any device capable of receiving data that has been transmitted over a serial link or other link, and optionally also capable of performing additional functions, which can include decoding and/or decryption of the received data, and other operations related to decoding, reception, or decryption of the received data. For example, the term receiver can denote a transceiver that performs the functions of a transmitter as well as the functions of a receiver.

The expression "serial link" is used herein to denote a serial link (having any number of channels) or a channel of a serial link, where the term "channel" of a serial link denotes a portion of the link that is employed to transmit data in serial fashion (e.g., a conductor or conductor pair between a transmitter and receiver over which data are transmitted serially, either differentially or in single-ended fashion).

There are various, well-known serial links for transmitting video data and other data. One conventional serial link is known as a transition minimized differential signaling interface ("TMDS" link). This link is used primarily for high-speed transmission of video data from a set-top box to a television, and also for high-speed transmission of video data from a host processor (e.g., a personal computer) to a monitor. Among the characteristics of a TMDS link are the following:

1. video data are encoded and then transmitted as encoded words (each 8-bit word of digital video data is converted to an encoded 10-bit word before transmission);

2. the encoded video data and a video clock signal are transmitted as differential signals (the video clock and encoded video data are transmitted as differential signals over conductor pairs without the presence of a ground line); and 3. three conductor pairs are employed to transmit the encoded video, and a fourth conductor pair is employed to transmit the video clock signal.

Another serial link is the "High Definition Multimedia Interface" interface ("HDMI" link) developed Silicon Image, Inc., Matsushita Electric, Royal Philips Electronics, Sony Corporation, Thomson Multimedia, Toshiba Corporation, and Hitachi. It has been proposed to transmit encrypted video and audio data over an HDMI link.

Another serial link is the "Digital Video Interface" ("DVI" link) adopted by the Digital Display Working Group. It has been proposed to use the cryptographic protocol known as the "High-bandwidth Digital Content Protection" ("HDCP") protocol to encrypt digital video data to be transmitted over a DVI link, and to decrypt the encrypted video data at the DVI receiver. A DVI link can be implemented to include two TMDS links (which share a common conductor pair for transmitting a video clock signal) or one TMDS link, as well as additional control lines between the transmitter and receiver. We shall describe a DVI link (that includes one TMDS link) with reference to FIG. 1. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of Extended Display Identification ("EDID") data that specifies various characteristics of the monitor, and transmission by the transmitter of control signals for the monitor. Transmitter 1 includes three identical encoder/serializer units (units 2, 4, and 5) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

In operation of the FIG. 1 system, a cable comprising connectors 20 and 21 and conductors (wires) 22 is connected between transmitter 1 and receiver 3. Conductors 22 include a conductor pair for transmitting serialized data over Channel 0 from encoder 2 to decoder 8, a conductor pair for transmitting serialized data over Channel 1 from encoder 4 to decoder 10, a conductor pair for transmitting serialized data over Channel 2 from encoder 6 to decoder 12, and a conductor pair for transmitting a video clock over Channel C from transmitter 1 to receiver 3. Conductors 22 also include wires for the DDC channel (which can be used for bidirectional I2C communication between transmitter 1 and receiver 3), a Hot Plug Detect (HPD) line, "Analog" lines for analog video transmission from transmitter 1 to receiver 3, and "Power" lines for provision of power from transmitter 1 to a receiver 3.

Other serial links include the set of serial links known as Low Voltage Differential Signaling ("LVDS") links (e.g., "LDI," the LVDS Display Interface), each of which satisfies the TIA/EIA-644 standard or the IEEE-1596.3 standard, ethernet links, fiberchannel links, serial ATA links used by disk drives, and others.

During high-speed data transmission over a cable, the cable itself introduces losses and dispersion which reduce the signal quality at the receiver end. High-speed serial communication makes it possible to transfer high-speed data over a single conductor or conductor pair. However, as one or both of the frequency of transmitted signal and the cable length increases, the distortion due to frequency dependent delay and attenuation can make the eye at the receiver almost unusable. Also, handling of the cable itself becomes difficult for typical users in consumer applications.

Frequency dependent attenuation not only attenuates signals but also generates dispersion. These artifacts increase the chance of false detection of received signals. The most important parameter for the receiver is the eye opening at the receiver. A larger eye opening is correlated with better signal quality. Major sources of signal distortion are frequency dependent attenuation, imperfect impedance matching, far end cross talk and EMI. For relatively low frequency signals, various signal processing techniques (e.g., adaptive equalization) have been used to compensate for signal distortion. However, for higher frequency signals, especially those indicative of an NRZ (non return to zero) data stream, equalization becomes more difficult if the cable characteristics are not well defined or known. By using sophisticated methods, cable characteristics can be deduced using circuitry in a transmitter and/or receiver (with the cable connected between the transmitter and receiver) but this requires complex handshaking and signal processing circuitry.

Transmission of signals indicative of data (e.g., signals indicative of video or audio data) to a receiver over a cable degrades the data, for example by introducing time delay error (sometimes referred to as jitter) to the data. In effect, the cable applies a filter (sometimes referred to as a "cable filter") to the signals during propagation over the cable. The cable filter can cause inter-symbol interference (ISI).

Equalization is the application of an inverted version of a cable filter to signals received after propagation over a link. The function of an equalization filter (sometimes referred to as an "equalizer") is to compensate for, and preferably cancel, the cable filter. A transmitter can implement "pre-emphasis" equalization by applying relatively greater amplification to some data values of a sequence of data values to be transmitted, and relatively less amplification to other data values of the sequence. A receiver can also implement an equalization filter.

In a system for transmitting data over a cable from a transmitter to a receiver, either or both of the transmitter and receiver can perform equalization. In many such systems, the user can couple any of a variety of cables between the transmitter and receiver and can swap one cable for another (e.g., one of different length) when desired. A set of equalization parameters suitable for use with one cable would often be unsuitable for use when this cable is replaced by another cable (e.g., a much shorter or much longer cable). Until the present invention it had been time-consuming and/or expensive to determine an optimal (or suitable) set of equalization parameters for an equalization filter in a transmitter or receiver of such a system (for example, since characterization of cable properties had required complex handshaking and signal processing circuitry, as noted above).

SUMMARY OF THE INVENTION

In a class of embodiments, the invention is a cable including a memory which stores cable data (indicative of at least one characteristic of the cable), a conductor set, and circuitry coupled to at least one conductor of the conductor set and configured to respond to a cable data request received on at least one conductor of the conductor set (e.g., from a transmitter or other external device coupled to the cable) by accessing at least some of the stored cable data and asserting the accessed data serially to at least one conductor of the conductor set (e.g., for transmission to an external device coupled to the cable). The conductor set includes at least one conductor and typically two or more conductors. The memory and the circuitry can be included in a serial device, or the circuitry can be included in a serial device and the memory can be an element distinct from and coupled to the serial device. An external device can use the cable data to implement equalization or otherwise to mitigate adverse effects due to cable-introduced losses and dispersion. For example, in typical embodiments the cable is coupled between a transmitter and a receiver, and a serial device in the cable is configured to assert cable data (requested by the transmitter) serially to the transmitter. The transmitter can then use the cable data to implement equalization. For example, the transmitter can use the cable data to choose optimum pre-emphasis values for pre-emphasis of content data (data to be transmitted over the cable to the receiver), and/or to set (or cause the receiver to set) parameters for equalization circuitry and/or termination circuitry in the receiver. For example, the transmitter could transmit at least some of the cable data (or signals generated in response to the cable data) to the receiver for use by the receiver in setting equalization parameters.

In another class of embodiments, the inventive cable includes circuitry for asserting information (e.g., by displaying an indication of cable data stored within the cable) to a user or external device (e.g., a transmitter or receiver coupled to the cable). In some such embodiments, the cable is configured to implement at least one cable guide function by asserting cable guide information, for example, by displaying an indication of the cable guide information. The cable guide information can indicate what type of device a free end of the cable should be connected to when the other end of the cable has been connected to a device of known type. Circuitry within the cable can cause the cable to display an indication of the type of device to which the free end should be connected when the circuitry has determined that the other end of the cable has been connected to a device of known type.

In typical embodiments, the inventive cable includes two connectors, a conductor set is coupled between the connectors, and a serial device is included in one of the connectors (or in each of both connectors) or is distributed over both connectors. Cable data can be stored in a memory that is included in one said serial device, or can be stored in at least one memory that is distinct from but coupled to at least one said serial device. The serial device is coupled to a "cable data channel" (one or more conductors of the conductor set, and typically one or two conductors of the conductor set) and is configured to respond to a request for cable data (e.g., a request received over the cable data channel from a transmitter or other device external to the cable but coupled to the cable data channel) by asserting cable data (stored in the memory) over the cable data channel (e.g., to an external device). Typically, a serial bus controller in a transmitter (or other device external to the cable) controls communication over the cable data channel. A control mechanism (for accessing cable data from the cable and using the accessed cable data) can be implemented as software (e.g., as a software device driver) and can be programmed into a serial bus controller in a transmitter (or other device external to the cable).

In typical use, the cable is coupled between a transmitter and receiver and a cable data channel of the cable is employed for relatively low-speed, serial communication between the transmitter and receiver while data (e.g., video and/or audio data) are transmitted (from the transmitter to the receiver) at a higher data rate over other conductors of the cable's conductor set. As one example, the transmitter and receiver are coupled via a DVI link, the Display Data Channel ("DDC") lines of the DVI link are the cable data channel. Serial communication over the cable data channel (between an external device and a serial device in the cable) can occur at a relatively slow speed, and if so, the serial device can be implemented more simply than if the serial communication must occur at a high data rate.

In typical embodiments, the serial device of the inventive cable is an I2C interface and includes a ROM which stores the cable data. Typically, the cable data are indicative of all or some of the cable manufacturer, the cable type and/or cable class, a date code, a frequency-dependent attenuation table, FEXT (far-end crosstalk) coefficients, cable impedance, cable length (electrical length), cable grade, EMI-related coefficients, common mode radiation, cable speed, intra pair skew, and other information. The ROM can be a mask ROM in which the cable manufacturer writes cable data regarding the specific cable or cable model, or it can be a PROM which is programmed at the manufacturing stage with cable data regarding the specific cable or cable model. Alternatively, the cable data are stored in another type of ROM or other memory. For example the memory (which stores the cable data) can be an analog memory implemented as a resistor or resistor network, or it can be another analog memory.

In some embodiments, the cable includes at least one LED (or other radiation-emitting element) coupled to and driven by circuitry (e.g., a serial device) in the cable. In some embodiments, the cable has two serial devices (e.g., one in a connector at one end of the cable and another in a connector at the cable's other end) and two LEDs (or other radiation-emitting elements), one driven by each serial device. Preferably, each serial device is configured to generate driving signals in response to signals (which can be, but are not necessarily, commands) from an external device (e.g., by translating commands received over the cable data channel from a serial device master in a transmitter coupled to the cable, where the serial device master controls communication over the cable data channel). The driving signals can cause a LED (or other radiation-emitting element) to produce an appropriate color, brightness, and/or blinking pattern. The serial device can cause an LED (or other radiation-emitting element) to emit radiation indicative of connection status (e.g., whether the cable is properly connected to a transmitter and/or receiver), or number of errors, or other information (e.g., other information for diagnosing signal transmission or cable status).

In a system including an embodiment of the inventive cable coupled between a transmitter and receiver, one or both of the transmitter and receiver can include an LED (or other radiation-emitting element) and circuitry for driving the radiation-emitting element. Radiation emitted from each radiation-emitting element can guide cable installation or checkup of connections such as by indicating connection status and/or other information using color, brightness or blinking pattern.

Radiation emitted from each radiation-emitting element (in the inventive cable and/or an external device coupled thereto) can also indicate the type of signal (or types of signals) being transmitted through the cable (e.g., a digital signal, content protected signal, or audio signal), or specific signal activities, for example, using color, brightness and blinking pattern.

In some embodiments, cable data stored in the inventive cable include data indicative of whether the cable is a secure cable (one over which the transmitter can securely transmit encrypted data). In some embodiments, the cable stores a cryptographic key set, and a serial device in the cable is configured to execute a verification operation with a transmitter in which the transmitter and serial device identify themselves (this step typically includes an exchange of keys) and the transmitter determines whether the cable is a secure digital cable. In a system including one of the latter embodiments of the inventive cable, the transmitter would typically also perform a verification operation with the receiver. Upon successful completion of verification operations with both the receiver and a serial device in the cable, the transmitter would transmit encrypted data to the cable, and the encrypted data would propagate through the cable to the receiver and undergo decryption in the receiver. For example, if each of the transmitter and receiver includes a cipher engine and is configured to operate in accordance with the HDCP protocol, each of the transmitter, receiver, and cable could store an HDCP key set. The HDCP key set stored in the transmitter would include at least some keys unique to the transmitter (or to a small number of devices including the transmitter), the HDCP key set stored in the receiver would include at least some keys unique to the receiver (or to a small number of devices including the receiver), and the HDCP key set stored in the cable would include at least some keys unique to the cable (or to a small number of devices including the cable).

In preferred embodiments, the inventive cable is configured for high-speed transmission of binary signals.

In a class of embodiments, the invention is a system including any embodiment of the inventive cable and a transmitter and receiver coupled to the cable. In other embodiments, the invention is a method for accessing cable data stored in any embodiment of the inventive cable and/or using cable data accessed from a memory of any embodiment of the inventive cable.

DETAILED DESCRIPTION OF PREFERRED EMBODIMENTS

Figure 1:
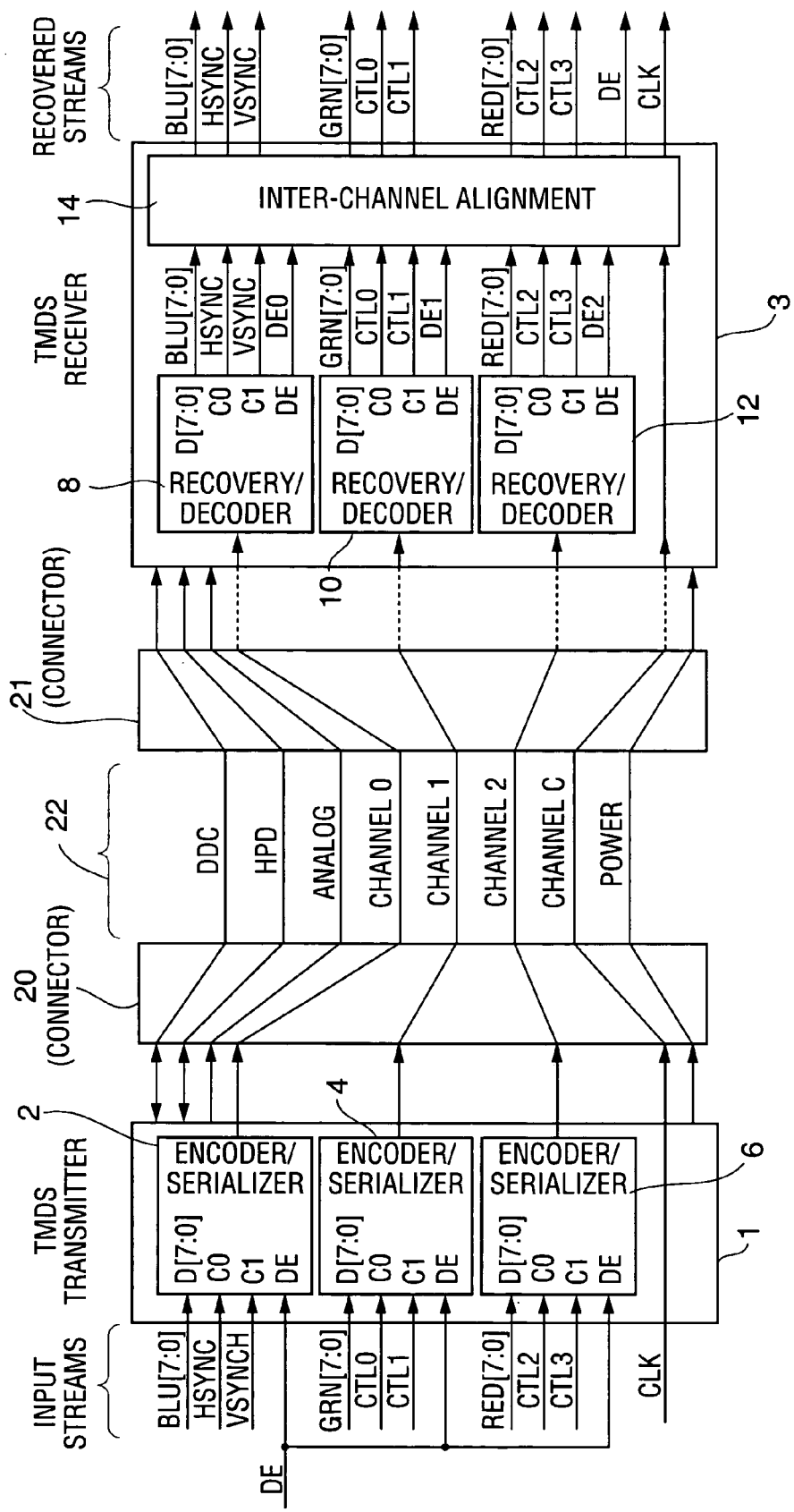
FIG. 1 is a block diagram of a conventional system for transmitting data over a DVI link (that includes one TMDS link). The system includes a transmitter, a receiver, and a cable between the transmitter and receiver.

In a class of embodiments, the invention is a cable which stores cable data, and includes a conductor set (at least one conductor, and typically two or more conductors) for transmitting data between a transmitter and a receiver coupled to the cable, and a serial device for asserting cable data to an external device (e.g., the transmitter) coupled to the cable. At least one conductor of the conductor set is employed as a "cable data channel" over which the serial device transmits cable data serially to an external device (e.g., the transmitter) coupled to the cable. The serial device is coupled to the cable data channel and configured to respond to a request for cable data (from the transmitter or other device external to the cable but coupled to the cable data channel) by asserting cable data over the cable data channel to the external device.

In preferred embodiments, the inventive cable includes a read-only memory (ROM) which stores the cable data. In other embodiments, the inventive cable includes a memory other than a ROM which stores the cable data. For example, in some embodiments, the inventive cable includes an analog memory. For example, the analog memory can be implemented as a resistor or resistor network which stores cable data in the sense that when the cable is connected to a device, analog circuitry within the device is coupled to the analog memory, and the analog circuitry determines (reads) the cable data by measuring or generating a current or voltage (or other electrical signal) indicative of the cable data, where the electrical signal is determined by a resistance (or ratio of resistances) in turn determined by the analog memory.

The expression "serial device" is used herein to denote a device capable of communication over a serial link with another device (e.g., a transmitter or receiver). In a class of embodiments (e.g., embodiments in which the inventive cable implements a DVI link between a transmitter and a receiver), the cable's "serial device" includes interface circuitry coupled and configured for I2C communication with an I2C master device within the transmitter (e.g., I2C communication with an I2C master device over the DDC channel of a DVI link). Such interface circuitry would implement an I2C slave protocol to assert (to the transmitter) cable data from a ROM coupled to the interface circuitry, in response to I2C control bits received from the transmitter.

In preferred embodiments, video data (and/or audio data and/or other data) are transmitted serially over a first subset of the conductors of the conductor set, and a second subset of the conductors comprises the cable data channel. Typically, the second subset is distinct from the first subset, but alternatively the second subset includes at least one conductor of the first subset.

In other embodiments, video data (and/or audio data and/or other data) are transmitted in parallel fashion over a first subset of the conductors of the conductor set, and a second subset of the conductors comprises the cable data channel (over which cable data are transmitted serially to a device external to the cable). Typically, the second subset is distinct from the first subset, but alternatively the second subset includes at least one conductor of the first subset.

Embodiments of the inventive cable will be described with reference to FIGS. 2, 3, 4, and 5. The system of each of FIGS. 2, 3, 4, and 5 includes a transmitter, a receiver, and a DVI link between the transmitter and receiver. Cable 32 in FIG. 2 includes conductor set 35 which includes all conductors needed to implement a DVI link between transmitter 31 and receiver 33. Connector 34 of cable 32 is configured to be coupled to transmitter 31 so as to couple each conductor of set 35 to a corresponding terminal of transmitter 31, and connector 36 of cable 32 is configured to be coupled to receiver 33 so as to couple the other end of each conductor of set 35 to a corresponding terminal of receiver 33.

Figure 3:
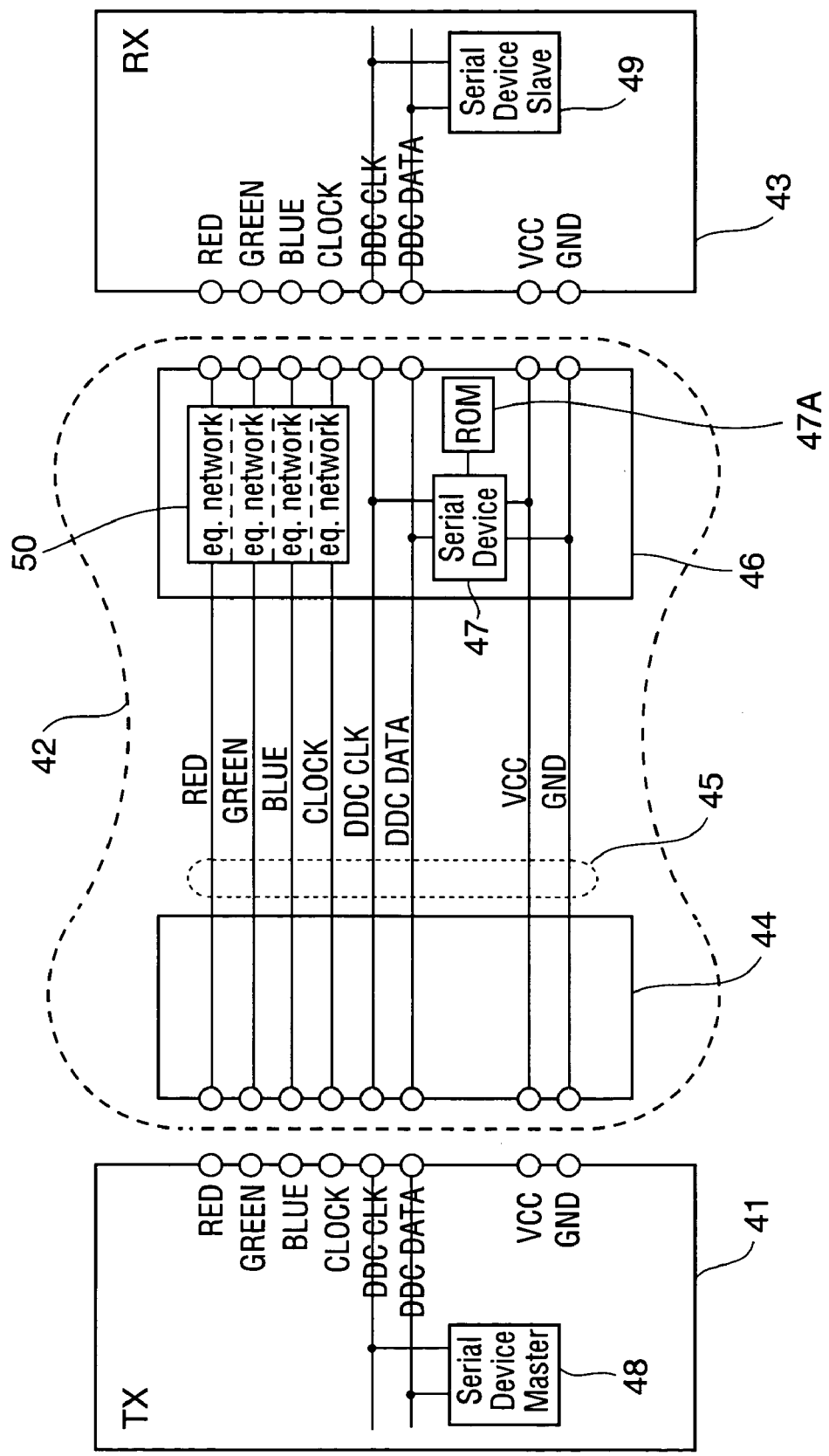
FIG. 3 is a block diagram of a transmitter, a receiver, and another embodiment of the inventive cable (including equalization circuitry) between the transmitter and receiver.

Cable 42 in FIG. 3 includes conductor set 45 which includes all conductors needed to implement a DVI link between transmitter 41 and receiver 43. Connector 44 of cable 42 is configured to be coupled to transmitter 41 so as to couple each conductor of set 45 to a corresponding terminal of transmitter 41, and connector 46 of cable 42 is configured to be coupled to receiver 43 so as to couple the other end of each conductor of set 45 to a corresponding terminal of receiver 43.

Figure 4:
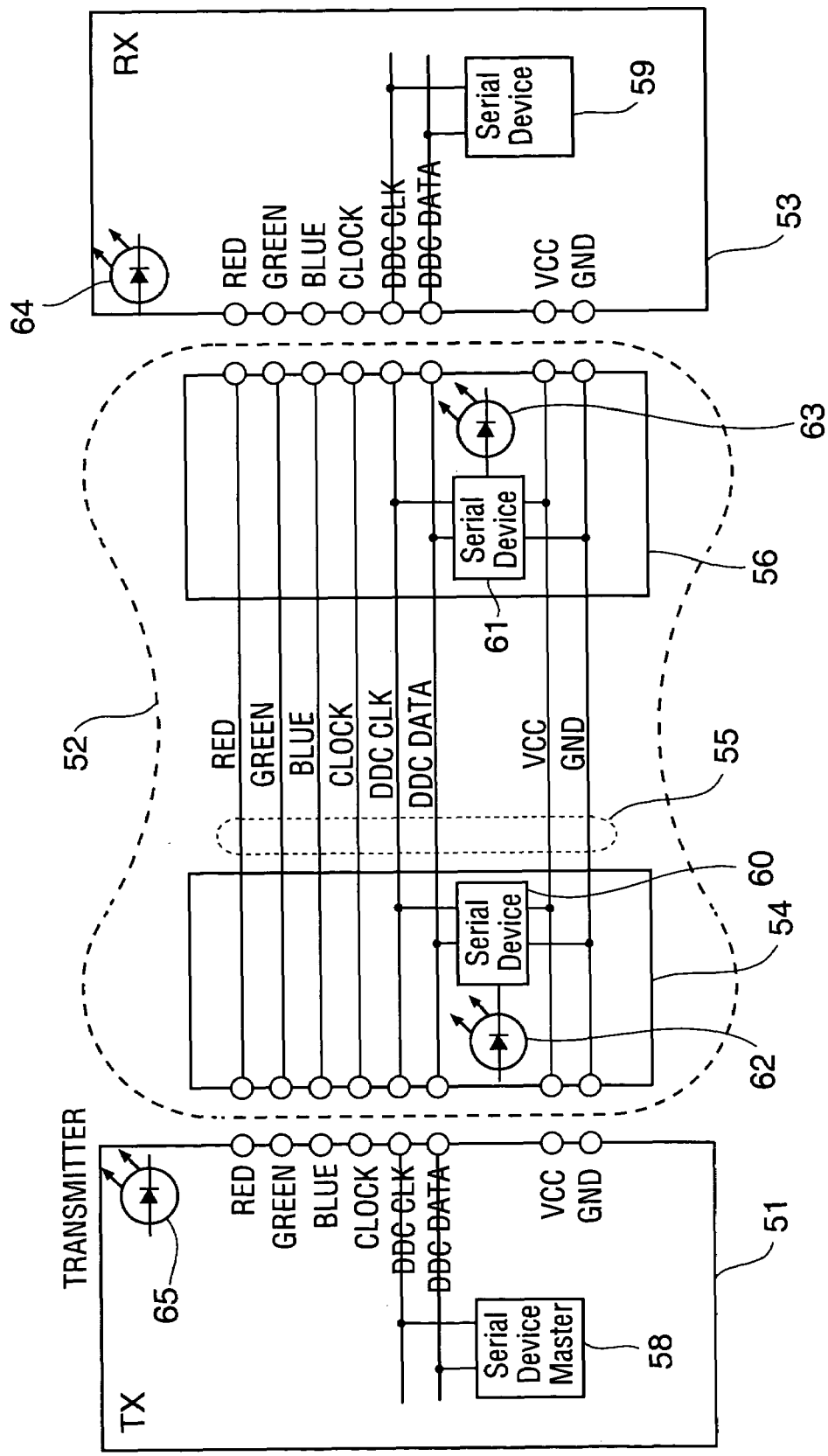
FIG. 4 is a block diagram of a transmitter, a receiver, and another embodiment of the inventive cable (including two serial devices, each coupled to an LED) between the transmitter and receiver.

Similarly, cable 52 in FIG. 4 includes conductor set 55 which includes all conductors needed to implement a DVI link between transmitter 51 and receiver 53. Connector 54 of cable 52 is configured to be coupled to transmitter 51 so as to couple each conductor of set 55 to a corresponding terminal of transmitter 51, and connector 56 of cable 52 is configured to be coupled to receiver 53 so as to couple the other end of each conductor of set 55 to a corresponding terminal of receiver 53.

Figure 2:
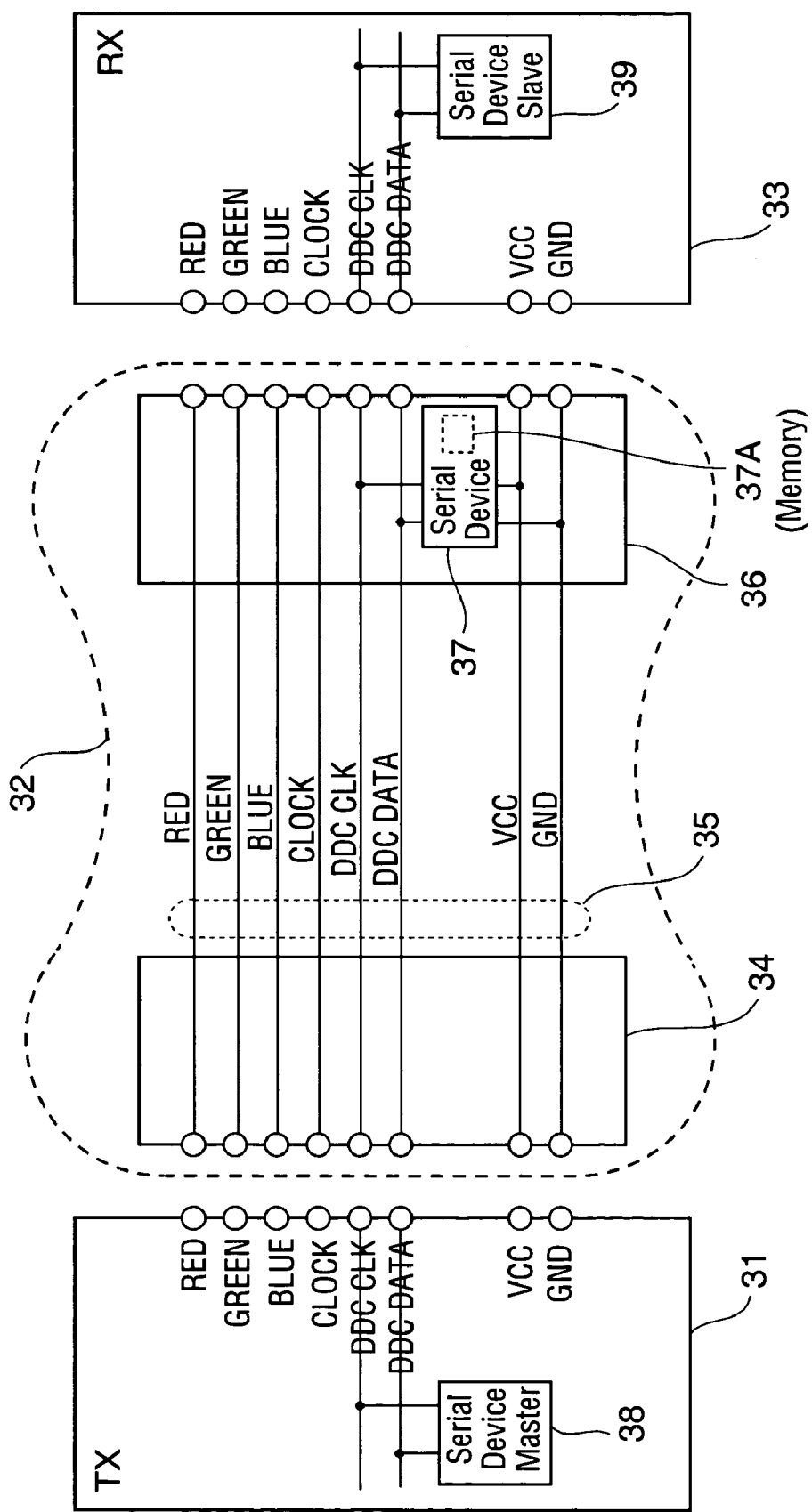
FIG. 2 is a block diagram of a transmitter, a receiver, and an embodiment of the inventive cable between the transmitter and receiver.

Each of conductor sets 35, 45, and 55 includes three conductor pairs (labeled "Red," "Green," and "Blue") for transmitting high-speed binary NRZ data (typically video data, or video and audio data), and a conductor pair (labeled "Clock") for transmitting a clock (a pixel clock) for such data. Each of conductor sets 35, 45, and 55 also includes conductors (labeled "DDC CLK" and "DDC DATA") which respectively comprise the DDC channel of the DVI link of FIG. 2, FIG. 3, and FIG. 4. The DDC channel of FIG. 2 is for bidirectional communication (at relatively low speed) between transmitter 31 and receiver 33, the DDC channel of FIG. 3 is for bidirectional communication (at relatively low speed) between transmitter 41 and receiver 43, and the DDC channel of FIG. 4 is for bidirectional communication (at relatively low speed) between transmitter 51 and receiver 53. The DDC channel of each DVI link can also be used for sharing HDCP keys in the case that the relevant transmitter/receiver pair is configured to implement the HDCP protocol.

Each of conductor sets 35, 45, and 55 also includes DDC Power lines (labeled "VCC" and "GND") and can include other conductors (not shown).

Serial device master 38 (connected as shown in transmitter 31) controls serial communication (in accordance with the I2C protocol) over the DDC channel of the DVI link of FIG. 2 with each of serial device 39 (connected as shown in receiver 33) and serial device 37 (connected as shown in connector 36 of cable 32. Serial device master 48 (connected as shown in transmitter 41) controls serial communication (in accordance with the I2C protocol) over the DDC channel of the DVI link of FIG. 3 with each of serial device 49 (connected as shown in receiver 43) and serial device 47 (connected as shown in connector 46 of cable 42. Serial device master 58 (connected as shown in transmitter 51) controls serial communication (in accordance with the I2C protocol) over the DDC channel of the DVI link of FIG. 4 with each of serial device 59 (connected as shown in receiver 53), serial device 60 (connected as shown in connector 54 of cable 52), and serial device 61 (connected as shown in connector 56 of cable 52). Each of serial devices 37, 39, 47, 49, 59, 60, and 61 includes an I2C interface.

Serial device 37 includes memory 37A which stores cable data in accordance with the invention. In preferred implementations, memory 37A is a ROM (either a mask ROM in which the cable manufacturer writes the cable data, or a PROM which is programmed at the manufacturing stage with the cable data). Alternatively, memory 37A is another type of other memory.

Typically, the cable data are indicative of all or some of the cable manufacturer, the cable type and/or cable class, a date code, a frequency-dependent attenuation table, FEXT (far-end crosstalk) coefficients, cable impedance, cable length (electrical length), cable grade, EMI-related coefficients, common mode radiation, cable speed, intra pair skew, and other information.

In FIG. 3, memory 47A (coupled to serial device 47) stores cable data in accordance with the invention. Memory 47A is preferably implemented as a ROM.

Each of serial devices 60 and 61 (of FIG. 4) and 77 (of FIG. 5) also includes a memory (preferably a ROM) which stores cable data in accordance with the invention. In variations on cable 32, 52, or 72, the cable's serial device (e.g., a serial device that replaces serial device 37, 47, or 77) does not include a memory which stores cable data, but the cable does include such a memory (in one of its connectors) that is distinct from and coupled to the cable's serial device.

Each of cables 32, 42, and 52 is an intelligent cable in the sense that it includes a built-in active serial device (typically implemented as an integrated semiconductor circuit) configured to respond to a request for cable data stored in the cable. Each on-cable serial device (e.g., device 37, 47, 60, or 61) can be implemented using commercially available technology (e.g., as a commercially available module or modified version of such a module).

Conventionally, the DDC channel of a DVI link is used to transmit an Extended Display Identification ("EDID") message from a monitor associated with a receiver to a transmitter, and to transmit control signals for the monitor from the transmitter. The EDID message specifies various characteristics of the monitor. In the FIG. 2 system, devices 38 and 39 are configured to perform these conventional operations. For example, device 38 is configured to assert an EDID request over the DDC channel to device 39, and device 39 is configured to respond to such request by transmitting an EDID message to device 38 over the DDC channel. The I2C protocol allows several serial devices to be connected along one pair of conductors, and allows an I2C master device (e.g., device 38) to communicate with any desired one of such serial devices. Thus, in accordance with the invention, device 38 is configured to query device 39 to determine whether receiver 33 has equalization capability (and device 39 is configured to respond to such a query), and device 38 is also configured to assert to device 37 a request for cable data stored in cable 32 (and device 37 is configured to respond to such a request).

In the systems of FIG. 3 and 4, devices 48, 49, 58, and 59 are configured to perform the conventional DDC channel operations described in the previous paragraph. In accordance with the invention, device 48 is also configured to query device 49 to determine whether receiver 43 has equalization capability (and device 49 is configured to respond to such a query), device 48 is configured to assert to device 47 a request for cable data stored in cable 42 (and device 47 is configured to respond to such a request by asserting cable data from memory 47A to device 48 in serial fashion over one or both of the DDC CLK and DDC DATA lines), device 58 is configured to query device 59 to determine whether receiver 53 has equalization capability (and device 59 is configured to respond to such a query), and device 58 is configured to assert to device 60 or 61 a request for cable data stored in cable 52 (and the relevant one of devices 60 and 61 is configured to respond to such a request by asserting cable data to device 58 in serial fashion over one or both of the DDC CLK and DDC DATA lines).

In other embodiments, the inventive cable is used to implement a link that is not a DVI link but does include a DDC channel, and its conductor set includes Display Data Channel ("DDC") lines for implementing the DDC channel. Preferably, the cable includes a serial device configured to respond to a request for cable data (received on at least one of the DDC lines) by asserting cable data (accessed from a memory in the cable) to at least one of the DDC lines (e.g., for transmission in serial fashion to an external device coupled to the DDC lines).

One respect in which the FIG. 3 system differs from the FIG. 2 system is that cable 42 includes equalization network 50, while cable 32 of FIG. 2 does not include equalization circuitry. Network 50 includes an equalization filter for each of the video data channels (conductors "Red," "Green," and "Blue") and the pixel clock channel (the conductor pair labeled "Clock"). Equalization network 50 is typically implemented as passive circuitry. Preferably, the cable data stored in memory 47A of cable 42 includes equalization data indicating that cable 42 is equipped with equalization network 50 and indicating at least one characteristic or parameter of equalization network 50. Device 47 is preferably configured to respond to a cable data request from device 48 by transmitting the equalization data to device 48 in serial fashion over the DDC channel. Transmitter 41 is preferably configured to use the equalization data as an input in its own determination as to whether to equalize the data and clock signals to be transmitted over the video data and pixel clock channels and if so what equalization to apply to such data and clock signals. For example, transmitter 41 can use the equalization data from cable 52 to choose pre-emphasis values that will not result in over-equalization of the data and clock signals received at receiver 43 after transmission over the video data and pixel clock channels (and undergoing equalization in network 50).

An equalization network in the cable (e.g., equalization network 50) can be useful for reducing dispersion and reflection. In the case of signal transmission over a very long cable, the transmitter would typically actively boost the signal to be transmitted to mitigate expected loss during transmission, and would typically also de-skew each differential signal transmitted over the cable (e.g., the differential signal transmitted over each of the conductor pairs labeled "Red," "Green," "Blue," and "Clock" in the system of FIG. 2, 3, 4, or 5) to mitigate intra pair skews.

The FIG. 4 system differs from the FIG. 2 in several respects: cable 52 of FIG. 4 includes two serial devices (60 and 61) rather than one; each serial device of cable 52 is coupled to a light-emitting diode (LED); transmitter 51 includes LED 65 (transmitter 31 includes no LED); and receiver 53 includes LED 64 (receiver 33 includes no LED). LED 62 of cable 52 is coupled to and driven by serial device 60, and LED 63 of cable 52 is coupled to and driven by serial device 61. In variations on the FIG. 4 system at least one of the LEDs is replaced by a radiation-emitting element of another type.

In FIG. 4, device 60 is preferably configured to generate driving signals for LED 62 by translating commands received over the DDC channel from device 58 in transmitter 51. Device 61 is preferably configured to generate driving signals for LED 63 by translating commands received over the DDC channel from device 59 in receiver 53 or from device 58 in transmitter 51. In response to the driving signals, LEDs 60 and 61 emit radiation having a desired appropriate color, brightness, and/or blinking pattern. The driving signals asserted by serial device 60 can cause LED 62 to emit radiation indicative of connection status (e.g., whether connector 54 is properly connected to transmitter 51), or number of errors, or other information (e.g., other information for diagnosing signal transmission status or status of cable 52). The driving signals asserted by serial device 61 can cause LED 63 to emit radiation indicative of connection status (e.g., whether connector 56 is properly connected to receiver 53), or number of errors, or other information (e.g., other information for diagnosing signal transmission or status of cable 52).

In the FIG. 4 system, transmitter 51 includes circuitry for driving LED 65, and receiver 53 includes circuitry for driving LED 64. Preferably, transmitter 51 is configured to drive LED 65 such that the color, brightness and/or blinking pattern of radiation emitted from LED 65 is useful for guiding cable installation or checkup of connections (e.g., the radiation is indicative of whether cable 52 is connected to one or both of transmitter 51 and receiver 53). Preferably, receiver 53 is configured to drive LED 64 such that the color, brightness and/or blinking pattern of radiation emitted from LED 64 is useful for guiding cable installation or checkup of connections (e.g., the radiation is indicative of whether cable 52 is connected to one or both of transmitter 51 and receiver 53).

The color, brightness and/or blinking pattern of radiation emitted from all or some of LEDs 62, 63, 64, and 65 can also indicate the type of signal (or types of signals) being transmitted through cable 52 (e.g., whether the signal is a digital signal, content protected signal, or audio signal) and/or can indicate specific signal activities.

The color, brightness and/or blinking pattern of radiation emitted from LED 62 and/or 63 can change in response to the data itself (i.e., in response to the data being transmitted from transmitter 51 to receiver 53). Preferably, serial device 58 in transmitter 51 or device 59 in receiver 53 asserts (via the DDC channel) signals indicative of specific information regarding the data, and serial device 60 and/or 61 translates such signals into LED-driving signals.

An example of how the color, brightness, or blinking pattern of radiation emitted from LED 62, 63, 64, and/or 65 can be used is for cable management and debugging of cable problems in systems that employ many cables (e.g., a system in a typical studio, in which multiple cables are connected between multiple devices and in which multiple cables can be connected between two devices). In such systems, connecting appropriate cables to the proper devices and keeping track of the cables' connections can be difficult tasks. An LED in each cable that corresponds to a device pair can emit a specific color or on/off light pattern, and an LED in each device that corresponds to a cable can emit a specific color and/or pattern. When such LEDs are available, the user only needs to check cables that emit (or fail to emit) specific radiation to determine 'error' status. Or, the user can match all devices and cables that display a specific color and/or blinking light pattern.

If LED 62 and/or LED 63 is implemented as a multiple-color LED, the circuitry for controlling LED 62 and/or LED 63 (to cause them to emit radiation indicative of signal type and/or signal activity) can be implemented more simply.

Figure 5:
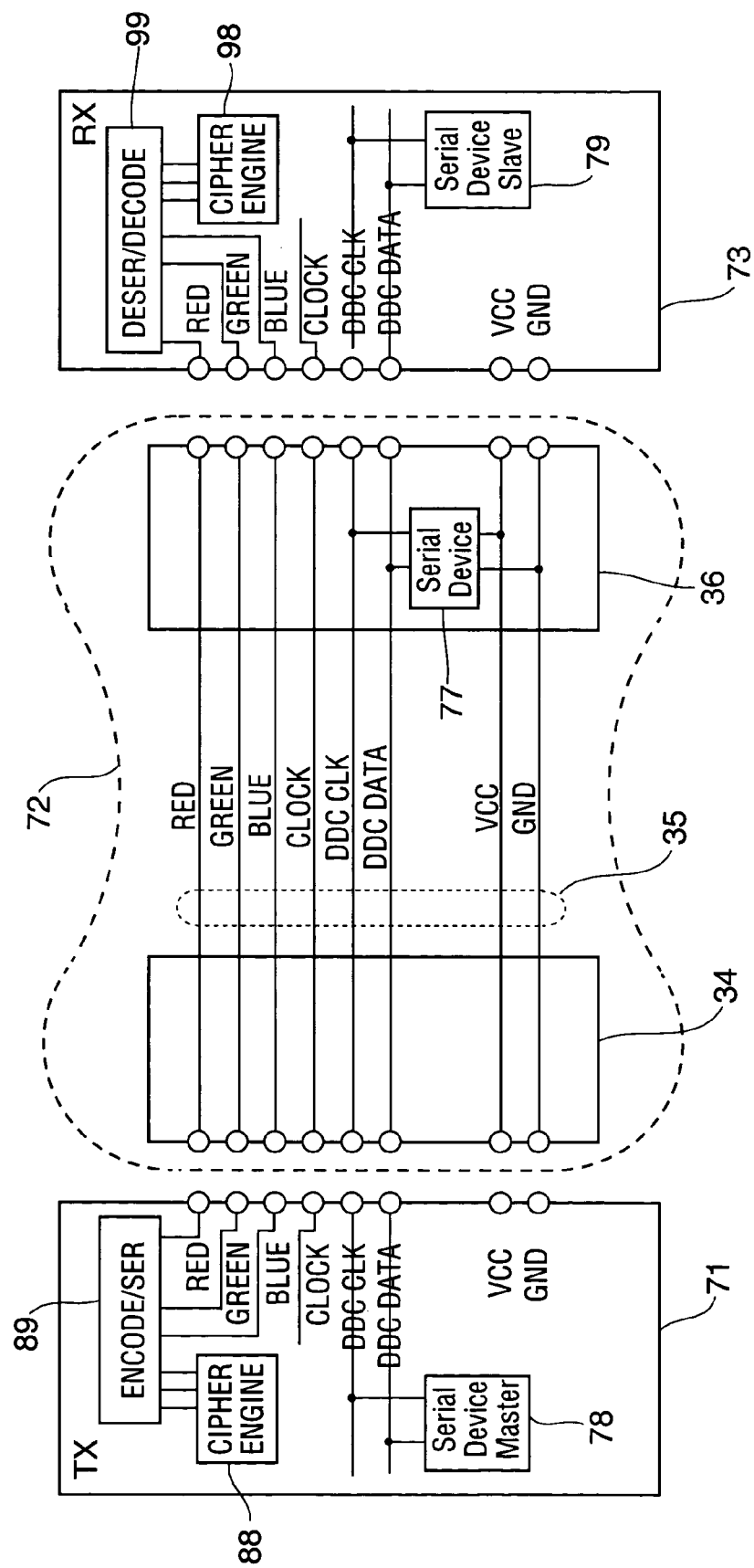
FIG. 5 is a block diagram of a transmitter, a receiver, and another embodiment of the inventive cable between the transmitter and receiver, in which each of the transmitter and receiver includes a cipher engine.

We next describe the system of FIG. 5 which includes transmitter 71, receiver 73, and cable 72 coupled between transmitter 71 and receiver 73. The elements of FIG. 5 that are identical to corresponding elements of FIG. 2 are numbered identically in FIGS. 2 and 5 and the foregoing description of them will not be repeated. Transmitter 71 includes cipher engine 88 and encoder/serializer circuitry 89 (for encoding encrypted data generated by cipher engine 88, serializing the encoded, encrypted data, and transmitting the serialized data). Receiver 73 includes deserializer/decoder circuitry 99 (for decoding and deserializing encoded, encrypted data received from cable 72) and cipher engine 98 for decrypting the decoded data output from circuitry 99). Serial device 77 of cable 72 is configured to perform all the operations performed by serial device 37 of FIG. 2 and includes a memory for storing cable data. In preferred implementations, the cable data stored in device 77 include data indicative of whether cable 72 is a secure cable over which transmitter 71 can securely transmitted encrypted data, and transmitter 71 is configured not to transmit encrypted data to cable 72 unless and until transmitter 71 receives cable data indicating that cable 72 is a secure cable.

In other preferred implementations, device 77 stores a cryptographic key set. In implementations of this type, a different cryptographic key set is preferably stored in each of cipher engine 88, cipher engine 98, and cable 72, and device 77 is configured to execute a verification operation with transmitter 71 over the DDC channel. In this verification operation, transmitter 71 and device 77 identify themselves (this step typically includes an exchange of keys) and transmitter 77 determines whether cable 72 is a secure digital cable. Transmitter 71 would also perform another verification operation directly with receiver 73 (e.g., a conventional verification operation performed over the DDC channel). Upon successful completion of verification operations with both receiver 73 and serial device 77, transmitter 71 would transmit encrypted data to cable 72, and the encrypted data would propagate through cable to receiver 73 and undergo decryption in cipher engine 79.

In a class of embodiments, cipher engines 88 and 98 and device 77 operate in accordance with the HDCP protocol, and each stores an HDCP key set. During operation of such embodiments of the FIG. 5 system (before transmission of encrypted data by transmitter 71), transmitter 71 would perform a verification operation with each of device 77 and receiver 73, and would not transmit encrypted data to cable 72 until after successfully completing both verification operations. The verification operation between transmitter 71 and receiver 73 could be a conventional HDCP verification operation. The verification operation between transmitter 71 and device 77 could also be a conventional HDCP verification operation, or it could be a modified version of a conventional HDCP verification operation. The HDCP key set stored in the transmitter would include at least some keys unique to the transmitter (or to a small number of devices including the transmitter), the HDCP key set stored in the receiver would include at least some keys unique to the receiver (or to a small number of devices including the receiver), and the HDCP key set stored in the cable would include at least some keys unique to the cable (or to a small number of devices including the cable).

In any of the described embodiments, the serial bus master in the transmitter (serial device 38, 48, 58, or 78) is preferably configured to obtain cable data (by communicating with the serial device in the cable) as soon as the cable is attached to the transmitter. The serial bus master in the transmitter is preferably also configured to query a serial device in the receiver (device 39, 49, 59, or 79) to determine whether the receiver has equalization capability, and the serial device in the receiver is configured to assert receiver data (indicative of the receiver's equalization capability) serially to the transmitter in response to such a query. The transmitter is preferably configured to use the cable data and the receiver data obtained from the cable and receiver to perform at least one (and preferably all) of the following operations:

determining optimal pre-emphasis values for equalizing data and clock signals in the transmitter before the data and clock signals are transmitted over the cable, and determining optimal receiver equalization values (for equalization of data and clock signals in the receiver), both assuming a specific rate of data transmission over the cable to the receiver;

sending equalization data and/or control bits to the receiver to set (or cause the receiver to set) at least one parameter of equalization circuitry in the receiver (e.g., equalization circuitry in deserializer/decoder circuitry 99 of receiver 73 of FIG. 5). For example, the transmitter can transmit at least some of the cable data (and/or control bits generated in response to the cable data) to the receiver for use by the receiver to set at least one equalization parameter;

skewing video data (e.g., RGB data) to be transmitted over the cable to minimize crosstalk;

skewing the two components of at least one differential signal transmitted over a conductor pair of the cable to minimize EMI and intra pair skews that result during transmission (e.g., skewing the two components of the differential signal transmitted over each of the conductor pairs labeled "Red," "Green," "Blue," and "Clock" in the system of FIG. 2, 3, 4, or 5); and sending data or control bits to the receiver to set (or cause the receiver to set) at least one parameter of termination circuitry in the receiver (e.g., termination circuitry in deserializer/decoder circuitry 99 of receiver 73 of FIG. 5). For example, the transmitter could send control bits to the receiver to direct the receiver to adjust the impedance of a termination coupled to each of the conductor pairs labeled "Red," "Green," "Blue," and "Clock" in the system of FIG. 2, 3, 4, or 5, to terminate each conductor of each such conductor pair with a specific impedance.

In a class of embodiments, the inventive cable includes a subsystem configured to assert information (e.g., by displaying an indication of cable guide information) to a user or external device. In some such embodiments, the cable implements at least one cable guide function by asserting cable guide information (e.g., by displaying an indication of the cable guide information) to a user or external device. For example, the cable guide information can indicate what type of device a free end of the cable should be connected to when the other end of the cable has been connected to a device of known type. In some such embodiments, circuitry in the cable causes the cable to display an indication of the type of device to which the free end should be connected when the circuitry has determined that the other end of the cable has been connected to a device of known type.

In a typical embodiment in this class, when one end of the cable is connected to a device, circuitry (e.g., a serial device) within the cable determines what device the cable is connected to, and automatically indicates what device the other end of the cable should be connected to. For example, the cable displays an indication of the type of device to which the free end of the cable should be connected, e.g., by causing an LED in the cable to emit radiation indicating this information. If the target device (to which the free end of the cable should be connected) is configured to display a matching indication (identifying the connector of the target device that should receive the cable), the user just needs to find the matching indication (e.g., the same colored glow) near one of the connectors of the target device (which may be one of many audio-visual devices mounted on a rack) and connect the free end of the cable to that connector.

Embodiments in this class can be implemented to rely on an external device (coupled to the cable) to supply power to the circuitry within the cable. Alternatively, the inventive cable could include its own power supply for supplying power to the serial device or other circuitry within the cable. In typical display systems in which a cable is connected between a display device (e.g., a monitor) at one end of the cable, and a host, computer, set-top box, or similar device at the other end of the cable, power supplies in the devices at both ends of the cable are coupled to power lines within the cable. For example, the Hot Plug Detect (HPD) line of a DVI/HDMI standard cable is powered by the monitor (or other display device) to which the cable is connected, and the DDC power lines of such a cable are powered by the host (or computer or set-top box) to which the other end of the cable is connected.

Figure 6:
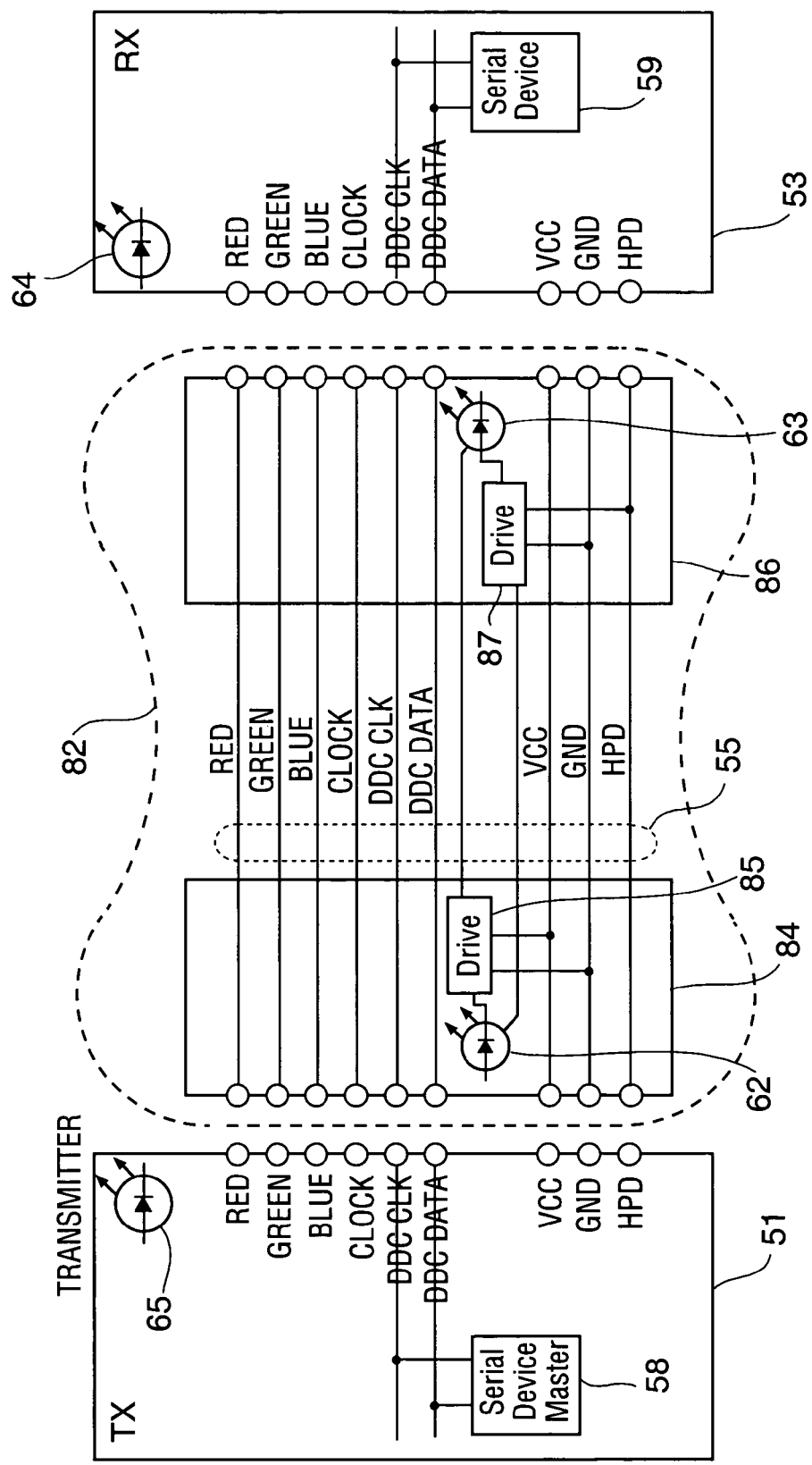
FIG. 6 is a block diagram of a transmitter, a receiver, and another embodiment of the inventive cable between the transmitter and receiver.

Cable 82, coupled between transmitter 51 and receiver 53 of FIG. 6, is an example of the embodiments discussed in the three preceding paragraphs. Transmitter 51 and receiver 53 of FIG. 6 are identical to transmitter 51 and receiver 53 of FIG. 4. Elements of cable 82 that are identical to corresponding elements of cable 52 of FIG. 4 are identically numbered in FIGS. 4 and 6. Cable 82 differs from cable 52 in that connector 84 of cable 82 includes LED drive circuit 85 (coupled to DDC power lines "VCC" and "GND" of cable 82 and to each of LED 62 and LED 63) rather than serial device 60 of FIG. 4, and in that connector 86 of cable 82 includes LED drive circuit 87 (coupled to the HPD line and the DDC ground line "GND" of cable 82 and to each of LED 62 and LED 63) rather than serial device 61 of FIG. 4. In variations on the FIG. 6 embodiment, circuit 87 and LED 63 are omitted, or circuit 85 and LED 62 are omitted.

LED drive circuits 85 and 87 of FIG. 6 do not communicate with transmitter 51 or receiver 53 via any of conductors 55. Instead, LED drive circuit 85 monitors DDC power lines within cable 82 to determine when cable 82 is coupled to a device that maintains at least a predetermined minimum voltage between the DDC power lines. The presence of such minimum voltage between the DDC power lines indicates that connector 84 or 86 is connected to a transmitter (because power is always supplied to the DDC channel of a DVI link by a transmitter). Circuit 85 causes LED 62 and LED 63 to display an indication that the free end of cable 82 should be connected to the DVI connector of a display device in response to determining that the voltage between the DDC power lines exceeds the minimum voltage.

LED drive circuit 87 monitors the electric potential of the Hot Plug Detect (HPD) line within cable 82 (the HPD line is shown in FIG. 6, and is not shown but present in each of cables 32, 42, 52, and 72 of FIGS. 2, 3, 4, and 5) to determine when cable 82 is coupled to a device that maintains at least a predetermined minimum potential on the HDP line (i.e., a predetermined minimum voltage between the HPD line and a reference potential). The presence of the minimum potential on the HPD line indicates that connector 84 or 86 is connected to a receiver (because power is always supplied to the HPD line of a DVI link by a receiver, which is typically a display device). Circuit 87 thus causes LED 62 and LED 63 to display an indication that the free end of cable 82 should be connected to the DVI connector of a video source (e.g., a host, computer, or set-top box) in response to determining that the electric potential of the HPD line exceeds the minimum potential.

In the FIG. 6 embodiment, each of circuits 85 and 87 consumes power from a device (transmitter 51 or receiver 53) coupled to cable 82 as required to determine whether to drive LEDs 62 and 63, and to drive the LEDs at appropriate times. In other embodiments of the invention, the inventive cable includes its own power supply for supplying the power needed to display (or otherwise assert to a user or an external device) appropriate cable guide information and to determine when to assert the cable guide information.

In variations on the FIG. 6 embodiment, circuitry within the inventive cable, upon determining that a device is coupled to one end of the cable, causes the cable to display an indication of the type of device to which the connector at the cable's other end should be connected. For example, in some such embodiments, if the circuitry detects that the HPD line is powered up, it knows that one end of the cable is connected to a specific type of connector (e.g., a DVI connector) of a display device, and displays an indication that the other end of the cable should be connected to a specific type of connector (e.g., a DVI connector) of a host (or computer or set-top box). If the circuitry determines that DDC power is on, it knows that one end of the cable is connected to a host (or computer or set-top box) and displays an indication that the other end of the cable should be connected to a specific type of connector (e.g., a DVI connector) of a display device. The circuitry can cause an LED at one end (or at each of both ends) of the cable to emit radiation indicating that the free end of the cable should be coupled to a device of an indicated type (e.g., a type indicated by emitted radiation), or can cause any other indicating means in the cable to indicate (e.g., by emitting radiation) that the free end should be coupled to a device of an indicated type. Optionally, circuitry within the cable can cause LEDs (or any other indicating means) at both ends of the cable to emit radiation indicating (or otherwise to indicate) whether each end is or should be coupled to a device of an indicated type.

In some embodiments, the cable displays an indication at only one end of the cable (or displays different indications at different ends of the cable), but this requires more sophistication in the detection scheme. Embodiments which display the same indication at both ends of the cable (e.g., cable 82 of FIG. 6) are typically simpler to implement.

The serial device (or other circuitry) within the inventive cable can display cable guide information (or other information) in any of various ways. For example, the circuitry can cause an LED to blink when only one end of the cable is hooked up, and when both ends of the cable have been properly connected, the circuitry can cause the LED to emit steady light to indicate successful connection of both ends. Alternatively, the circuitry can change the color of display or brightness of the display to indicate appropriate cable guide information. Display of cable guide information in accordance with the invention can be useful if the cable can be fit into various very similar but not compatible connectors. When the cable has not been connected to the proper connector of a device to which it is supposed to be connected, the cable should not indicate a "successful connection" signal. Optionally, even when the cable has been connected to the correct connector of the correct device, if the connection is not proper in some electrical or mechanical sense, the cable does not indicate a successful connection signal. This functionality can reduce user frustration significantly when a complicated system does not work properly and the user is faced with the task of finding out what went wrong during establishment of a complicated web of connections.

In variations on embodiments described above, the inventive cable stores cable data other than in a ROM. For example, in some embodiments the inventive cable stores cable data in registers or other writable memory (e.g., a memory to which an external device can write new data to supplement previously-stored cable data, or to which an external device can write updated cable data to replace previously-stored cable data).

Figure 7:
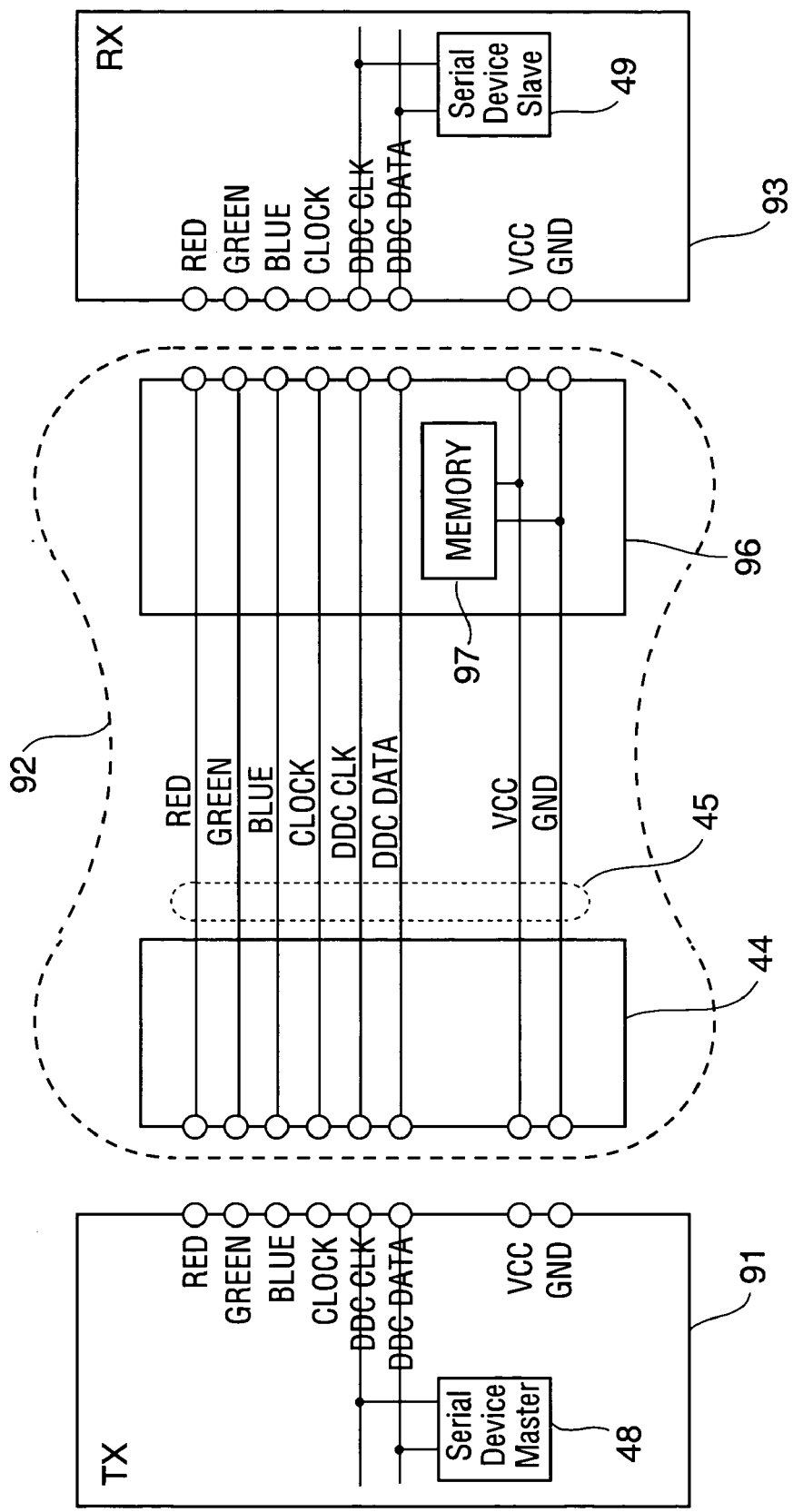
FIG. 7 is a block diagram of a transmitter, a receiver, and another embodiment of the inventive cable between the transmitter and receiver.

In other embodiments (e.g., the embodiment to be described with reference to FIG. 7), the inventive cable includes an analog memory which stores cable data. Cable 92 of FIG. 7 differs from cable 42 of FIG. 3 in that it lacks equalization network 50, serial device 47, and memory 47A, and instead includes analog memory 97. Analog memory 97 stores cable data (in a sense to be described), is coupled to DDC power lines "VCC" and "GND" of cable 92, and can be implemented as a resistor or resistor network. When the cable is connected to a device (transmitter 91 or receiver 93), analog circuitry (not specifically shown in FIG. 7) within the device is coupled via the DDC power lines to analog memory 97. The analog circuitry "reads" the cable data from memory 97 by generating or measuring a current (or other electrical signal) indicative of the cable data in response to asserting a predetermined voltage across the DDC power lines "VCC" and "GND." This current (or other electrical signal) is determined by a resistance (or ratio of resistances) that is in turn determined by the resistor or resistors that comprise analog memory 97.

In another class of embodiments, the invention is a method for providing cable data stored in a cable to an external device, including the steps of asserting a request from the external device to at least one conductor of the cable; and responding to the request by accessing at least some of the cable data and transmitting the accessed cable data serially from the cable to the external device on at least one conductor of the cable. When the external device is a transmitter configured to apply pre-emphasis to content data, the method can also include the step of determining pre-emphasis values for use in applying pre-emphasis to the content data in response to at least some of the cable data received from the cable. When the external device is a transmitter configured to transmit data over the cable to a receiver, and the receiver is configured to perform equalization on the data, the method can also include the steps of setting at least one said equalization parameter in response to at least some of the cable data received at the transmitter from the cable; and in the receiver, performing equalization on the data in accordance with the at least one equalization parameter. When the external device is a transmitter configured to transmit data over the cable to a receiver having termination circuitry, the method can also include the step of configuring the termination circuitry in response to at least some of the cable data received at the transmitter from the cable.

In another class of embodiments, the invention is a method for asserting cable guide information from a cable including a conductor set and an information asserting subsystem, said method including the steps of: (a) monitoring at least one conductor of the conductor set; and (b) in response to a change in state of at least one conductor of the conductor set, asserting the cable guide information from the information asserting subsystem. In some embodiments, step (b) includes the step of emitting radiation indicative of the cable guide information in response to a change in state of said at least one conductor of the conductor set indicating that a device is coupled to the cable. In some embodiments, step (b) includes the step of emitting radiation indicative of the cable guide information in response to a change in state of said at least one conductor of the conductor set indicating that a device of a first type is coupled to the cable, where the cable guide information is indicative of a second type of device to which a free end of the cable should be connected.

When the cable includes a conductor set, the external device is a transmitter configured to transmit data over the cable to a receiver, and the request is asserted from the transmitter to a first conductor subset of the conductor set and the accessed cable data are transmitted to the external device over the first conductor subset, the method can also include the step of transmitting content data from the transmitter to the receiver over a second conductor subset of the conductor set. When the cable includes Display Data Channel lines and other conductors, the external device is a transmitter configured to transmit data over the cable to a receiver, the request is asserted from the transmitter to at least one of the Display Data Channel lines and the accessed cable data are transmitted to the external device over at least one of the Display Data Channel lines, the method can also include the step of transmitting content data from the transmitter to the receiver over at least one of the other conductors.

When the cable includes a radiation-emitting element, the method can also include the steps of asserting commands from the external device to the cable on at least one conductor of the cable, and in response to the commands, operating circuitry in the cable to generate driving signals for the radiation-emitting element, and optionally also emitting radiation from the radiation-emitting element in response to the driving signals such that the radiation has at least one of a color, brightness, and blinking pattern determined by at least one of the commands.

When the external device is a transmitter and the cable stores a cryptographic key set, the method can also include the step of operating circuitry in the cable to execute a verification operation with the transmitter including by transmitting at least one cryptographic key of the key set over at least one conductor of the cable to the transmitter.

It should be understood that while some embodiments of the present invention are illustrated and described herein, the invention is defined by the claims and is not to be limited to the specific embodiments described and shown.

What is claimed is:

1. A cable, including:
   a conductor set;
   a memory that stores cable data indicative of at least one characteristic of the cable; and
   circuitry, coupled to at least one conductor of the conductor set, and configured to respond to a data request received on at least one conductor of the conductor set by accessing at least some of the cable data and asserting the accessed data serially to at least one conductor of the conductor set.

2. The cable of claim 1, wherein the cable includes a first serial device, and the first serial device includes the circuitry.

3. The cable of claim 2, wherein the memory is an element of the first serial device.

4. The cable of claim 3, wherein the first serial device is an I2C interface and the memory is a read-only memory.

5. The cable of claim 2, wherein the memory is distinct from but coupled to the first serial device.

6. The cable of claim 5, wherein the first serial device is an I2C interface and the memory is a read-only memory.

7. The cable of claim 2, wherein the cable also includes two connectors, the conductor set is coupled between the connectors, and the first serial device is included in one of the connectors.

8. The cable of claim 2, also including at least one radiation-emitting element coupled to and driven by the first serial device.

9. The cable of claim 8, wherein the radiation-emitting element is an LED.

10. The cable of claim 8, wherein the first serial device is configured to generate signals for driving the radiation-emitting element in response to signals received on at least one conductor of the conductor set.

11. The cable of claim 10, wherein the signals for driving the radiation-emitting element cause said radiation-emitting element to produce at least one of a color, brightness, and blinking pattern determined by at least one of the signals received on said at least one conductor of the conductor set.

12. The cable of claim 10, wherein the signals for driving the radiation-emitting element cause said radiation-emitting element to emit radiation indicative of connection status of the cable.

13. The cable of claim 10, wherein the signals for driving the radiation-emitting element cause said radiation-emitting element to emit radiation indicative of at least one of a specific signal activity and a type of signal being transmitted through the cable.

14. The cable of claim 10, wherein the cable includes a first radiation-emitting element and a second radiation-emitting element, the cable also includes a second serial device, the first serial device is configured to generate signals for driving the first radiation-emitting element in response to the signals received on said at least one conductor of the conductor set, and the second radiation-emitting element is coupled to and driven by the second serial device.

15. The cable of claim 1, wherein the cable data include data indicative of whether the cable is a secure cable.

16. The cable of claim 1, wherein the cable includes a serial device, the serial device includes the circuitry, the cable stores a cryptographic key set, and the serial device is also configured to execute a verification operation with an external device including by transmitting at least one cryptographic key of the key set over at least one conductor of the conductor set.

17. The cable of claim 1, wherein the memory is a read-only memory.

18. The cable of claim 17, wherein the read-only memory is a mask ROM.

19. The cable of claim 17, wherein the read-only memory is a PROM which has been programmed with the cable data.

20. The cable of claim 1, wherein the memory is an analog memory.

21. The cable of claim 1, wherein the cable data include data indicative of at least one of the cable's manufacturer, the cable's type, the cable's class, a frequency-dependent attenuation table, far-end crosstalk coefficients, the cable's impedance, the cable's length, the cable's grade, and a date code.

22. The cable of claim 1, wherein the conductor set includes at least one conductor pair for differential signal transmission, and the cable data include data indicative of at least one of EMI-related coefficients, common mode radiation, and intra pair skew.

23. The cable of claim 1, wherein the conductor set includes a first conductor subset configured for data transmission from a transmitter coupled to the cable to a receiver coupled to the cable, and a second conductor subset configured for serial communication between the transmitter and the receiver, and wherein the circuitry is configured to respond to the data request by asserting the accessed data serially to at least one conductor of the second conductor subset.

24. The cable of claim 23, wherein the second conductor subset consists of Display Data Channel lines.

25. A system, including:
a device;
a cable coupled to the device, wherein the cable includes:
a conductor set;
a memory that stores cable data indicative of at least one characteristic of the cable; and
circuitry, coupled to at least one conductor of the conductor set, and configured to respond to a data request received from the device on at least one conductor of the conductor set by accessing at least some of the cable data and transmitting the accessed cable data serially to the device on at least one conductor of the conductor set.

26. The system of claim 25, wherein the device is configured to use the cable data transmitted thereto to implement equalization.

27. The system of claim 25, wherein the device is a transmitter.

28. The system of claim 27, wherein the transmitter is configured to apply pre-emphasis to content data, and to use the cable data received from the cable to determine pre-emphasis values for use in applying pre-emphasis to the content data.

29. The system of claim 27, also including a receiver, wherein the cable is coupled between the receiver and the transmitter, the receiver is configured to equalize data received over the cable from the transmitter in accordance with at least one equalization parameter, and the transmitter is configured to use at least some of the cable data received from the cable to set at least one said equalization parameter.

30. The system of claim 27, also including a receiver, wherein the cable is coupled between the receiver and the transmitter, the receiver is configured to equalize data received over the cable from the transmitter in accordance with at least one equalization parameter, and the transmitter is configured to use at least some of the cable data received from the cable to cause the receiver to set at least one said equalization parameter.

31. The system of claim 27, also including a receiver, wherein the cable is coupled between the receiver and the transmitter, the receiver includes termination circuitry, and the transmitter is configured to use at least some of the cable data received from the cable to configure the termination circuitry.

32. The system of claim 27, also including a receiver, wherein the cable is coupled between the receiver and the transmitter, the receiver includes termination circuitry, and the transmitter is configured to use at least some of the cable data received from the cable to cause the receiver to configure the termination circuitry.

33. The system of claim 27, also including a receiver, wherein the cable is coupled between the receiver and the transmitter, the conductor set includes a first conductor subset configured for data transmission from the transmitter to the receiver, and a second conductor subset configured for serial communication between the transmitter and the receiver, and wherein the circuitry is configured to respond to the data request by transmitting the accessed data serially to transmitter over at least one conductor of the second conductor subset.

34. The system of claim 25, also including a second device, wherein the cable is coupled between the device and the second device, the conductor set includes Display Data Channel lines for serial communication between the device and the second device, and the circuitry is configured to respond to the data request by transmitting the accessed data serially to the device over at least one conductor of the Display Data Channel lines.

35. The system of claim 25, wherein the cable includes a serial device, and the serial device includes the circuitry.

36. The system of claim 35, wherein the memory is an element of the serial device.

37. The system of claim 36, wherein the serial device is an I2C interface and the memory is a read-only memory.

38. The system of claim 35, wherein the memory is distinct from but coupled to the serial device.

39. The system of claim 38, wherein the serial device is an I2C interface and the memory is a read-only memory.

40. The system of claim 35, wherein the cable also includes two connectors, the conductor set is coupled between the connectors, and the serial device is included in one of the connectors.

41. The system of claim 35, also including at least one radiation-emitting element coupled to and driven by the serial device.

42. The system of claim 41, wherein the radiation-emitting element is an LED.

43. The system of claim 41, also including a receiver, wherein the device is a transmitter, the cable is coupled between the receiver and the transmitter, the serial device is configured to generate signals for driving the radiation-emitting element in response to commands received from at least one of the transmitter and the receiver on at least one conductor of the conductor set.

44. The system of claim 43, wherein the signals for driving the radiation-emitting element cause said radiation-emitting element to produce at least one of a color, brightness, and blinking pattern determined by at least one of the commands.

45. The system of claim 43, wherein the signals for driving the radiation-emitting element cause said radiation-emitting element to emit radiation indicative of connection status of the cable.

46. The system of claim 43, wherein the signals for driving the radiation-emitting element cause said radiation-emitting element to emit radiation indicative of at least one of a specific signal activity and a type of signal being transmitted through the cable.

47. The system of claim 43, wherein at least one of the transmitter and the receiver includes a second radiation-emitting element and circuitry for driving the second radiation-emitting element.

48. The system of claim 47, wherein radiation emitted from at least one of the radiation-emitting element and the second radiation-emitting element has at least one of a color, brightness, and blinking pattern indicative of information useful for at least one of guiding installation of the cable and checking at least one connection of the cable.

49. The system of claim 25, wherein the cable data include data indicative of whether the cable is a secure cable.

50. The system of claim 25, wherein the device is a transmitter, the cable includes a serial device, the serial device includes the circuitry, the cable stores a cryptographic key set, and the serial device is also configured to execute a verification operation with the transmitter including by transmitting at least one cryptographic key of the key set over at least one conductor of the conductor set.

51. The system of claim 50, also including a receiver, wherein the cable is coupled between the receiver and the transmitter, and the transmitter is also configured to perform a verification operation with the receiver including by transmitting at least one cryptographic key over at least one conductor of the conductor set.

52. The system of claim 25, wherein the memory is a read-only memory.

53. The system of claim 25, wherein the memory is an analog memory.

54. The system of claim 25, wherein the cable data include data indicative of at least one of the cable's manufacturer, the cable's type, the cable's class, a frequency-dependent attenuation table, far-end crosstalk coefficients, the cable's impedance, the cable's length, the cable's grade, and a date code.

55. The system of claim 25, wherein the conductor set includes at least one conductor pair for differential signal transmission, and the cable data include data indicative of at least one of EMI-related coefficients, common mode radiation, and intra pair skew.

* * * * *